United States Patent
Lin et al.

(10) Patent No.: US 12,529,567 B2
(45) Date of Patent: Jan. 20, 2026

(54) METHOD OF PERFORMING INTER-SITE BACKUP PROCESSING OF WAFER LOTS

(71) Applicant: Taiwan Semiconductor Manufacturing Company Ltd., Hsinchu (TW)

(72) Inventors: Mei-Hsuan Lin, Hsinchu (TW); Rong Syuan Fan, Hsinchu (TW); Jen-Yuan Chang, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 144 days.

(21) Appl. No.: 17/855,075

(22) Filed: Jun. 30, 2022

(65) Prior Publication Data

US 2024/0003692 A1 Jan. 4, 2024

(51) Int. Cl.
*G01C 21/34* (2006.01)
*G06F 18/214* (2023.01)
*G06N 3/04* (2023.01)

(52) U.S. Cl.
CPC ..... *G01C 21/3415* (2013.01); *G01C 21/3492* (2013.01); *G06F 18/214* (2023.01); *G06N 3/04* (2013.01)

(58) Field of Classification Search
CPC .......... G01C 21/3415; G01C 21/3492; G06F 18/214; G06N 3/04; G06Q 10/06; G05B 19/41865; G05B 2219/45031; H01L 21/67276
See application file for complete search history.

(56) References Cited

U.S. PATENT DOCUMENTS

| | | | | |
|---|---|---|---|---|
| 6,308,107 | B1* | 10/2001 | Conboy | G06Q 10/08 700/121 |
| 6,839,601 | B1* | 1/2005 | Yazback | G06Q 10/087 700/121 |
| 7,620,470 | B1* | 11/2009 | Hickey | G05B 19/41865 700/121 |
| 2006/0106473 | A1* | 5/2006 | Enright | G06Q 10/0631 700/103 |
| 2008/0281456 | A1* | 11/2008 | Chen | G05B 19/4189 700/112 |
| 2020/0408546 | A1* | 12/2020 | Vaughn | G01C 21/3423 |
| 2021/0215491 | A1* | 7/2021 | Liu | G06Q 50/40 |

* cited by examiner

*Primary Examiner* — Ig T An
(74) *Attorney, Agent, or Firm* — Seed Intellectual Property Law Group LLP (57) ABSTRACT

A method includes: receiving an auxiliary routing request from a manufacturing execution system (MES) apparatus of a first site by an inter-site backup management apparatus; selecting an auxiliary route to a second site based on the auxiliary routing request and a statistical model by the inter-site backup management apparatus; including the auxiliary route in a route associated with a wafer lot by the MES apparatus; and performing a semiconductor processing operation on a wafer of the wafer lot according to the route.

20 Claims, 8 Drawing Sheets

METHOD OF PERFORMING INTER-SITE BACKUP PROCESSING OF WAFER LOTS

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Terms such as "about," "roughly," "substantially," and the like may be used herein for ease of description. A person having ordinary skill in the art will be able to understand and derive meanings for such terms based on knowledge of the industry, current fabrication techniques, and the like.

Semiconductor fabrication generally involves the formation of electronic circuits by performing multiple operations, such as depositions, etchings, annealings, and/or implantations of material layers, whereby a stack structure including many semiconductor devices and interconnects between is formed. A semiconductor "fab" or manufacturing facility includes fabrication tools that perform the operations. A semiconductor wafer is routed through the fabrication tools of the semiconductor fab to complete formation of the electronic circuits. In some modern semiconductor fabs, an auxiliary service route may be selected to route the semiconductor wafer to a second semiconductor fab nearby the semiconductor fab. A manufacturing execution system (MES) selects the auxiliary service route based on various factors, such as manufacturing constraints, tool availability, and the like. In many situations, an MES apparatus and method do not provide efficient backup routing between different semiconductor fab sites.

Embodiments of the disclosure include an MES apparatus and method that provide efficient routing between different semiconductor fab sites. For example, a first semiconductor fab site may be able to route semiconductor wafers to a second semiconductor fab site or a third semiconductor fab site. When an MES apparatus of the first semiconductor fab site assigns an auxiliary service route for a target lot (e.g., of semiconductor wafers), the second and third semiconductor fab sites may both be available to provide service. Further, the target lot may be routed to the second semiconductor fab site by an automated material handling system (AMHS) apparatus, meaning the second semiconductor fab site is in cross-site AMHS service range. Or, the target lot may be routed to the third semiconductor fab site by transportation vehicle support (e.g., by a freight truck), meaning the third semiconductor fab site is beyond the cross-site AMHS service range. The MES apparatus and method of the embodiments provides backup between different sites with consideration to manufacturing constraints, weather influence, traffic constraints, and even power, water, or chemical supply constraints, among others.

Figure 1A:
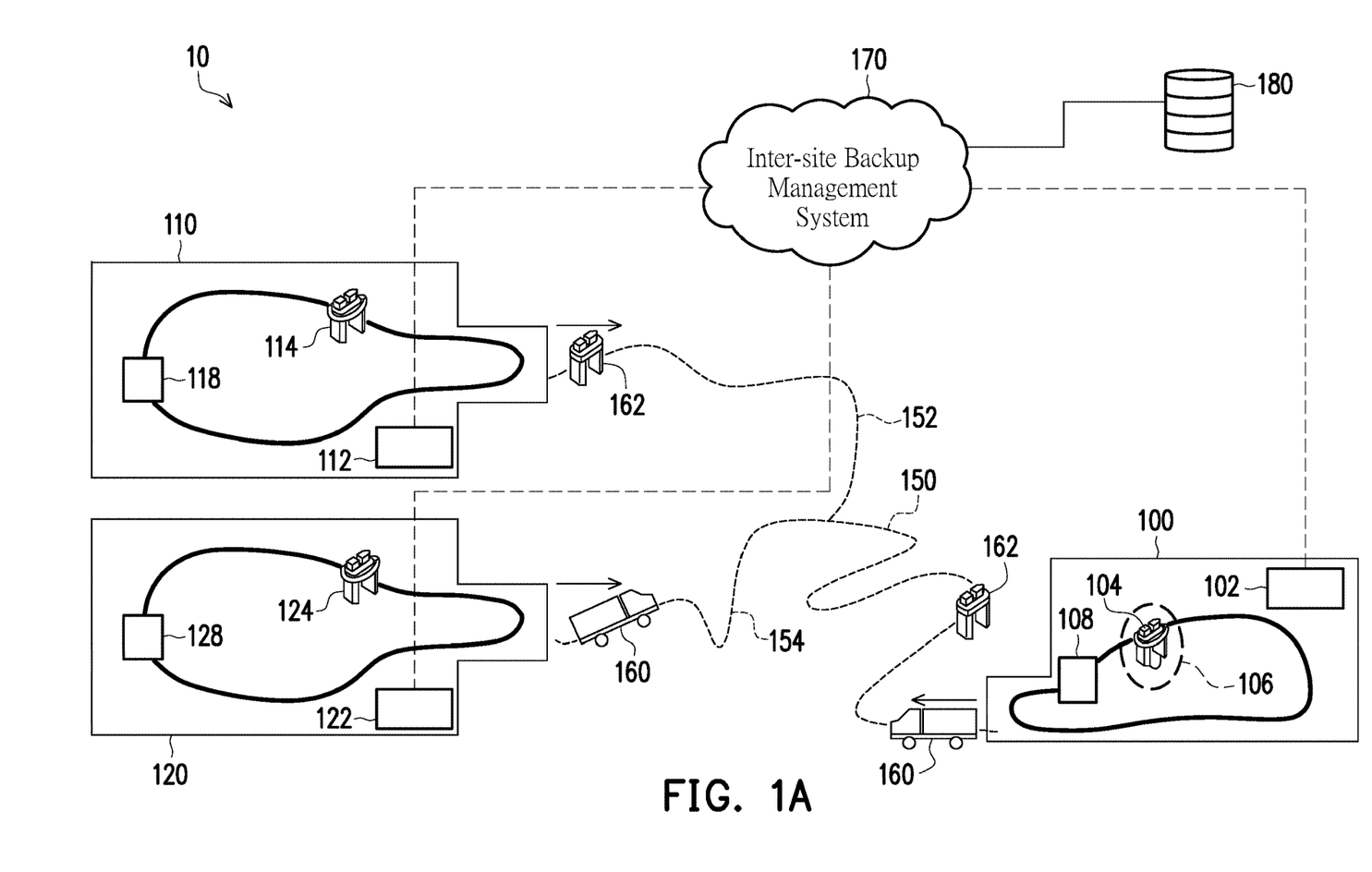
FIGS. 1A and 1B are views of cross-site backup routing according to embodiments of the present disclosure.
Figure 1B:
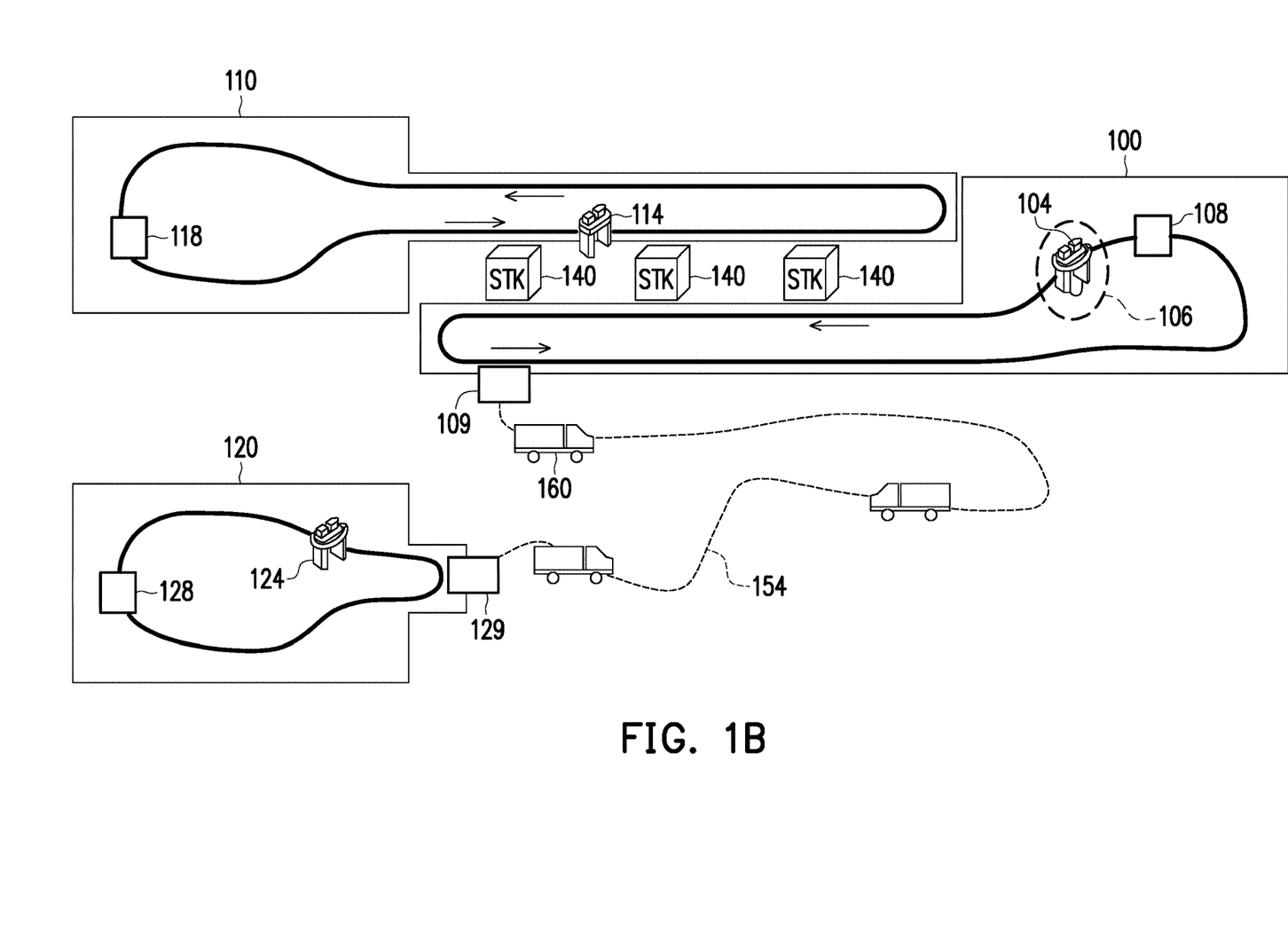

FIGS. 1A, 1B are views of cross-site semiconductor fab 10 including backup (or auxiliary) routing according to embodiments of the present disclosure. The cross-site semiconductor fab 10 may be referred to as "the fab 10" throughout the description. The fab 10 may include two or more semiconductor fab sites 100, 110, 120, which may be referred to as "sites 100, 110, 120" through the description. The sites 110, 120 may provide backup or auxiliary semiconductor processing support to the site 100. The sites 110, 120, 130 are interconnected by routes 150, 152, 154, which may include roads, tunnels, sky bridges, overhead hoist transport (OHT) tracks of an AMHS apparatus, and the like. Wafer carrying apparatuses, such as front opening unified pods (FOUPs), may carry semiconductor wafers 106 (e.g., work-in-progress (WIP) wafers, also called a "target lot") between the sites 110, 120, 130 by transportation vehicles 160 (e.g., freight trucks, trains, boats, airplanes, or the like) or OHTs 162. The site 120 may be outside a range of the AMHS apparatus, such that transfer of the semiconductor wafers over the route 154 is available by transportation vehicle 160. The site 110 may be in range of the AMHS apparatus, such that transfer of the semiconductor wafers over the route 152 is available by transportation vehicle 160 or OHT 162.

Each of the sites 100, 110, 120 may include a respective MES apparatus 102, 112, 122 a respective AMHS apparatus 104, 114, 124, and multiple respective semiconductor processing tools 108, 118, 128. The site 100 will be described in detail, and it should be understood that the sites 110, 120 are similar in many respects to the site 100, and repeated description of elements thereof will be omitted for brevity.

The manufacturing execution system (MES) apparatus 102 may be or include a computerized system for performing product scheduling. The MES apparatus 102 may provide information on how various conditions on a fab floor can be modified to improve wafer-per-hour (WPH) output. The MES apparatus 102 may provide real-time control of multiple elements (e.g., materials, operators, and tools) of a semiconductor fabrication process. A user may access resources on the MES apparatus 102 by a workstation (not shown), which may be remote from the MES apparatus 102. The workstation may be a personal computer, mobile device, or other suitable processing device, and may display MES information and allow for input by the user to the MES apparatus 102. In some embodiments, the MES apparatus 102 includes one or more local databases, which store data that describes various production lines and tools (e.g., the semiconductor processing tool 108) in the site 100. The MES apparatus 102 may determine production metrics for evaluating or predicting performance of the site 100, including production lines and semiconductor processing tools 108 thereof. The site 100 may report production and status information to the MES apparatus 102 over a communications network (not shown). The communications network may include an intermediate supervisory control and data acquisition (SCADA) system which communicates with the site 100. In some embodiments, data is reported to the MES apparatus 102 directly from the site 100 (e.g., from the semiconductor processing tools 108), which may be accomplished automatically or by manual entry.

The site 100 includes one or more semiconductor processing tools 108 configured to execute various manufacturing operations on a semiconductor wafer such that an IC device is fabricated in accordance with one or more masks. In various embodiments, semiconductor processing tools 108 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

The site 100 includes AMHS apparatus 104. The AMHS apparatus 104 may be a computer-controlled automated system for moving wafer storage containers to different locations in the site 100 and optionally to different locations in the site 110. In the embodiment shown in FIG. 1A, the AMHS apparatus 104 is an overhead system that includes one or more tracks that may be suspended from or otherwise mounted to the ceiling of the site 100. A plurality of vehicles, which may be overhead hoist transfer (OHT) vehicles, may be driven along the one or more tracks. A network of overhead tracks may extend throughout the site 100 to enable OHT vehicles to transfer wafer storage containers between different locations within the semiconductor fabrication facility. The locations may include staging areas, which may be associated with one or more of the semiconductor processing tools 108.

The site 100 may also include a communication network that enables the AMHS apparatus 104 to communicate with load ports and/or the semiconductor processing tools 108. In various embodiments, the load ports may send messages to the AMHS apparatus 104 indicating that a wafer storage container is ready to be picked up by an OHT vehicle and/or that the load port is ready to receive a new wafer storage container for processing by one of the semiconductor processing tools 108.

The MES apparatuses 102, 112, 122 are in data communication with an inter-site backup management system or apparatus 170. The inter-site backup management system 170 may be physically located at one of the sites 100, 110, 120, or may be physically located at an offsite location. The MES apparatuses 102, 112, 122 may be in data communication with the inter-site backup management system or apparatus 170 by one or more data networks, which may be wired, wireless, or a combination thereof. A system or apparatus 200 shown in FIG. 2 may be used as the inter-site backup management system or apparatus 170 in accordance with various embodiments.

A database 180 is in data communication with the inter-site backup management system or apparatus 170, as shown in FIG. 1A. The database 180 may be included in a memory 204 (see FIG. 2) of the inter-site backup management system or apparatus 170, may be external to the inter-site backup management system or apparatus 170, or some combination thereof. In some embodiments, the database 180 is in data communication with the inter-site backup management system or apparatus 170 by a data network, such as a wired network, a wireless network, or combination thereof.

The database 180 stores information used by the inter-site backup management system or apparatus 170 when generating an auxiliary route for the target lot 106. The information is or includes one or more of site information, transportation vehicle information, traffic information, weather forecast information, MES information, and the like. The auxiliary route is a move from a location in one site (e.g., a semiconductor processing tool 108 of the site 100) to another location in a different site (e.g., a semiconductor processing tool 118 of the site 110) for semiconductor processing. The auxiliary route may also be referred to as a backup route, and the different site may also be referred to as an auxiliary site or a backup site.

The site information may include information about the sites 100, 110, 120. For example, the site information may include information about whether the sites 100, 110, 120 are available for receiving target lots via auxiliary routing. For example, the site information may include information that indicates whether or not the site 100, 110, 120 is online (e.g., a site may be offline due to a power outage, earthquake, fire, or other anomaly). The site information may include information that indicates loading status of one or more tools 108, 118, 128 of the site 100, 110, 120. For example, one or more of the tools 108, 118, 128 may be at full capacity for a period of time, such as one day, one week, or longer. The loading status may also indicate whether one or more of the tools 108, 118, 128 is undergoing maintenance, which may render the tool 108, 118, 128 unavailable for a period of time, such as a few hours, a day, a week or longer.

The transportation vehicle information may include information about the transportation vehicles 160, AMHS apparatuses 104, 114, 124, or both. For example, the transportation vehicle information may include information about routing, scheduling and capacity of the transportation vehicles 160. The routing may indicate a number and order of stops (e.g., sites) for a transportation vehicle 160. The scheduling may indicate a time of departure and a time of arrival for each of the stops. The capacity may indicate how many more lots of wafers may be added to the transportation vehicle 160 (e.g., remaining capacity of the transportation vehicle 160) before departing from each of the stops. The transportation vehicle information may include information about operating status of the transportation vehicles 160. For example, one or more of the transportation vehicles 160 may be under maintenance (e.g., unavailable). The transportation vehicle information may optionally include information about the AMHS apparatuses 104, 114, 124. For example, the transportation vehicle information may indicate operating status (e.g., operational, down, etc.) and loading status (e.g., at capacity, overloaded, available, etc.) of the AMHS apparatuses 104, 114, 124.

The traffic information may include information about road conditions associated with the routing of the transportation vehicles 160. For example, the traffic information may include information about traffic jams, accidents, road construction (or detours), flooding, or other anomalies that have an effect on the routing of the transportation vehicles 160. The other anomalies may include train service outages or delays, airport closures, sea warnings that affect port access, or the like. An estimated delay may be associated with each of the anomalies and each of the routes of the transportation vehicles 160.

The weather forecast information may include information about weather events that may have an effect on the routing of the transportation vehicles 160. For example, the weather forecast information may indicate position and estimated time of one or more weather events, such as rain, heavy rain, tropical storm, typhoon, snow, hale, ice, fog, or the like, which may be associated with a delay or unavailability of the routing of the transportation vehicles 160.

The MES information may include information about the MES apparatuses 102, 112, 122. The MES information may include operating status information of the MES apparatuses 102, 112, 122, such as whether one or more and which of the MES apparatuses 102, 112, 122 is undergoing maintenance, is offline, is disconnected from the network, or is available. In some embodiments, the MES information includes information about scheduled downtime of one or more of the MES apparatuses 102, 112, 122, including an estimated start time and end time of the scheduled downtime.

As just described, the information is or includes one or more of the site information, the transportation vehicle information, the traffic information, the weather forecast information, and the MES information. One or more of the site information, the transportation vehicle information, the traffic information, the weather forecast information, and the MES information may be optional in some embodiments, or additional types of information may be included in the information. For example, information about customers, suppliers, materials distribution, or the like, may also be included in the information. The inter-site backup management system or apparatus 170 uses the information when generating the auxiliary route for the target lot 106. In some embodiments, the information stored in the database 180 is used to train a machine learning model, such as the machine learning model 209 (see FIG. 2), and the machine learning model may provide an estimate or ranked order list of auxiliary routes for selection as the auxiliary route of the target lot 106.

In another example, two sites (e.g., the sites 100, 110) are separated by a road (e.g., are positioned on opposite sides of the road), and may be interconnected by a sky bridge over the road. As such, the AMHS apparatuses (e.g., the AMHS apparatuses 104, 114) of the two sites may be interconnected through the sky bridge, such that a target lot may pass from one site (e.g., the site 100) to another site (e.g., the site 110) through the sky bridge. The sky bridge may be associated with a loading value, such as a selected number of OHTs that may pass through the sky bridge each day (or other suitable period of time, such as each hour, each 8-hour shift, or the like). The loading value of the sky bridge may be stored in the database 180 and used by the inter-site backup management system 170 to determine whether to select the sky bridge as the auxiliary route for the target lot 106.

FIG. 1B is a view of the cross-site semiconductor fab 10 including auxiliary routing according to embodiments of the present disclosure.

In FIG. 1B, the target lot 106 may be routed to the site 110 by the AMEN apparatuses 104, 114, as shown, or may be routed to the site 120 by the transportation vehicle 160 over the route 154 (e.g., a road or roads).

When the target lot 106 is routed to the site 120 by the transportation vehicle 160 over the route 154, the target lot 106 may be routed initially within the site 100 to a loading dock 109 by way of the AMHS apparatus 104. After arriving at the loading dock 109, the target lot 106 may be loaded onto the transportation vehicle 160. The transportation vehicle 160 may then transport the target lot 106 to a loading dock 129 of the site 120 by the route 154. After arriving at the loading dock 129, the target lot 106 may be transported by the AMHS apparatus 124 to, for example, one of the tools 128 or a nearby staging area.

Figure 1C:
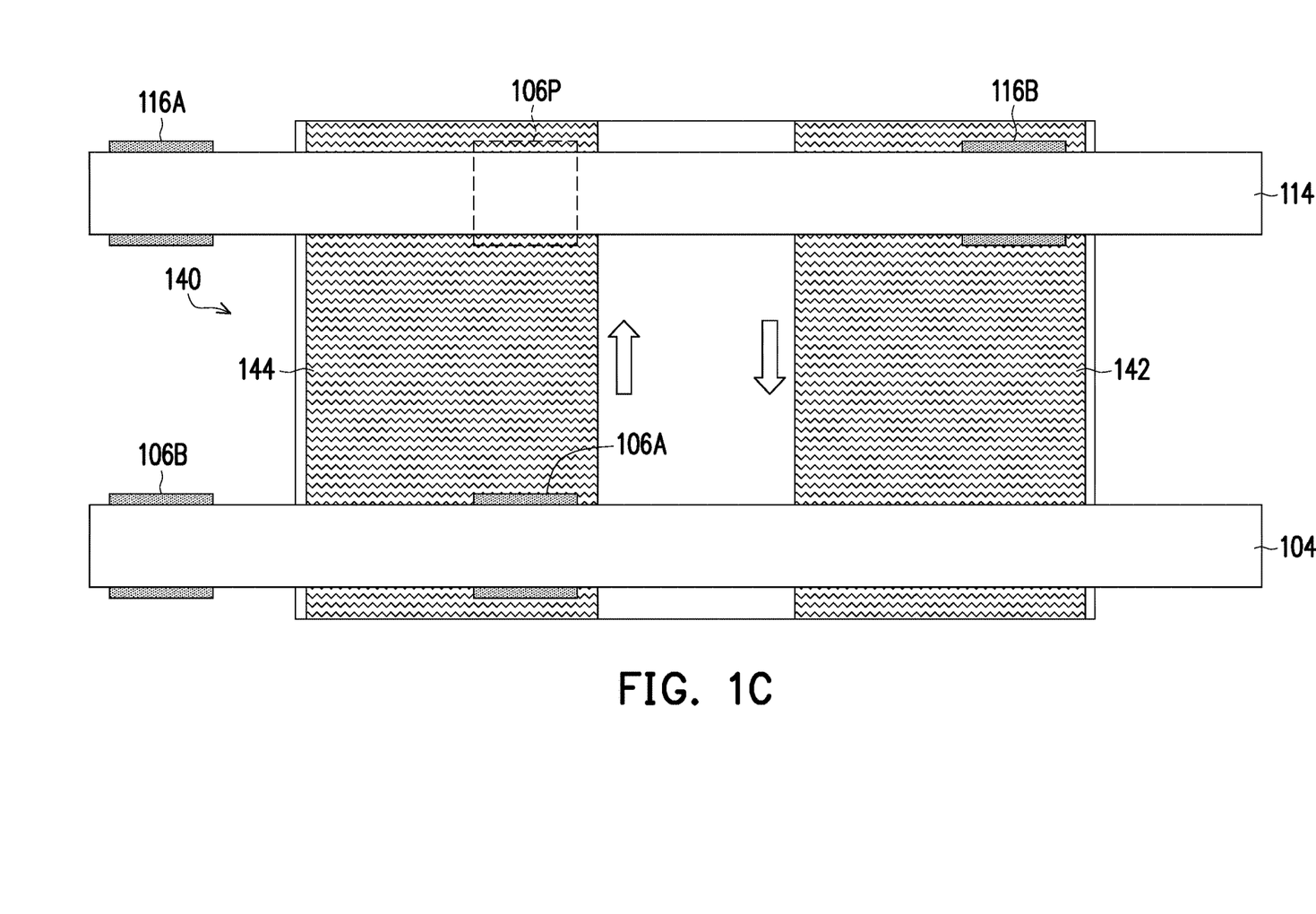
FIG. 1C is a view of a stocker in accordance with various embodiments.

When the target lot 106 is routed to the site 110, the target lot 106 may be transported by the AMHS apparatus 104 to the AMHS apparatus 114 through one of a plurality of stockers 140, an example of which is illustrated in FIG. 1C. The target lot 106 may be picked up initially by the AMHS apparatus 104 from a tool 108 or staging area. The AMHS apparatus 104 may transport the target lot 106 to one of the stockers 140, and may release the target lot 106 into the stocker 140. The AMHS apparatus 114 may stop at the stocker 140, pick up the target lot 106 from the stocker 140, then transport the target lot 106 to a tool 118 or nearby staging area.

FIG. 1C illustrates the stocker 140 in top view in accordance with various embodiments. The stocker 140 may be a building attached to, or room of, the site 100, the site 110, or both. The stocker 140 is accessible by the AMHS apparatus 104 and the AMHS apparatus 114. The stocker 140 includes one or more conveyor apparatuses 142, 144, which may be unidirectional (as indicated by arrows) or bidirectional, in some embodiments. For example, the conveyor apparatus 142 may be a conveyor belt that moves in a direction from the AMHS apparatus 104 toward the AMHS apparatus 114, and the conveyor apparatus 144 may be a conveyor belt that moves in a direction from the AMHS apparatus 114 toward the AMHS apparatus 104. In some embodiments, one or both of the conveyor apparatuses 142, 144 is bidirectional, meaning that the conveyor belt may move in either direction from the AMHS apparatus 104 toward the AMHS apparatus 114 or from the AHMS apparatus 114 toward the AMHS apparatus 104. The AMHS apparatuses 104, 114 may transport multiple lots 106A, 106B, 116A, 116B, as shown.

The AMHS apparatus 104 may transport a target lot 106A to a position over the conveyor apparatus 144. Once the target lot 106A is over the conveyor apparatus 144, the AMHS apparatus 104 may lower the target lot 106A onto the conveyor apparatus 144. After the target lot 106A is positioned on the conveyor apparatus 144, the conveyor apparatus 144 may convey the target lot 106A to a position 106P (shown in phantom) underlying the AMHS apparatus 114. After the target lot 106A arrives at the position 106P, the AMHS apparatus 114 of the site 110 may pick up the target lot 106A, and transport the target lot 106A to one of the semiconductor processing tools 118 or a staging area.

Similar to the sky bridge described above with reference to FIG. 1A, the stocker 140 may be associated with a loading value, such as a selected number of lots 106 that may pass through the stocker 140 each day (or other suitable period of time, such as each hour, each 8-hour shift, or the like). The loading value of the stocker 140 may be stored in the database 180 and used by the inter-site backup management system 170 to determine whether to select the stocker 140 as part of the auxiliary route for the target lot 106.

Figure 2:
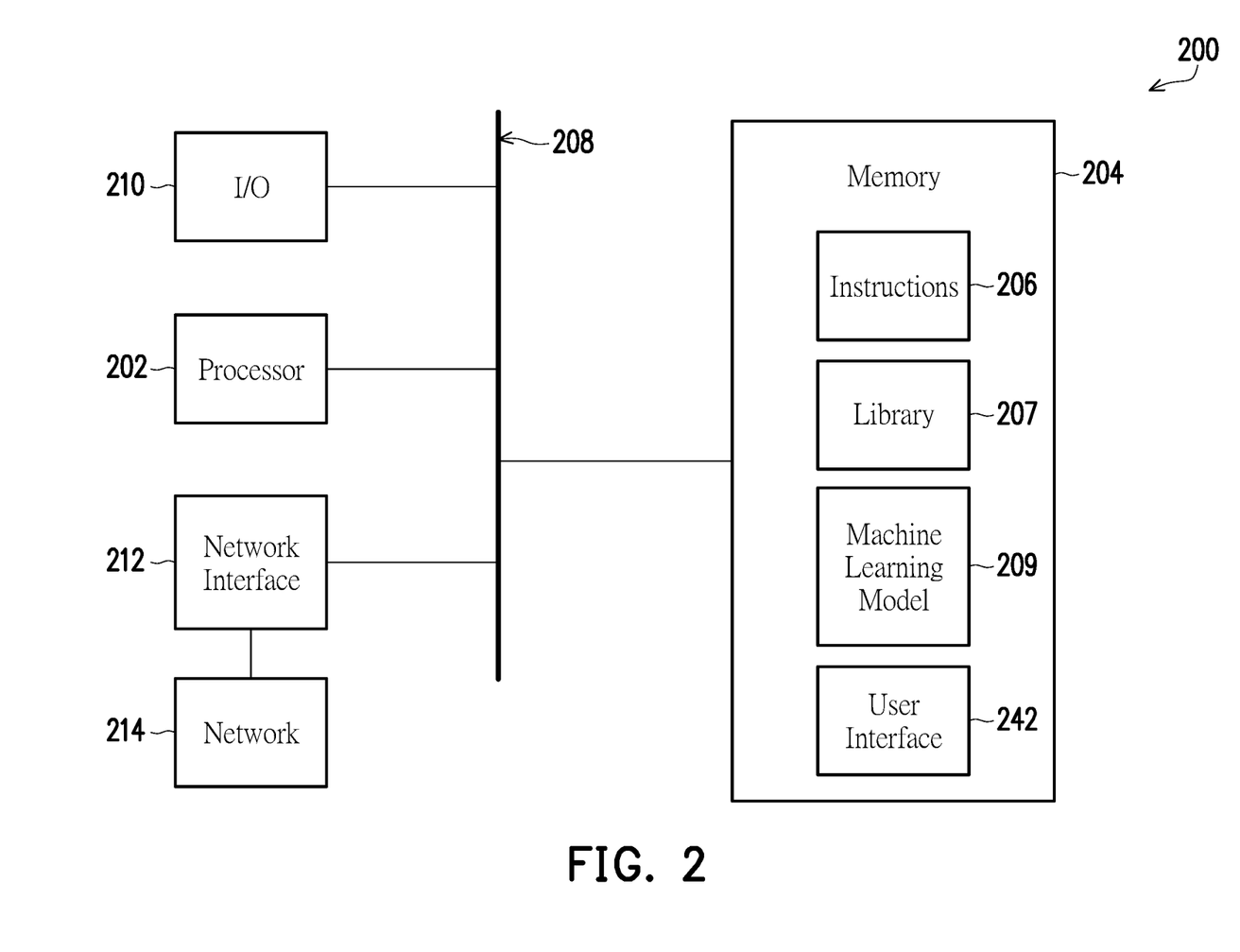
FIG. 2 is a view of an inter-site backup management system or apparatus in accordance with various embodiments.

FIG. 2 is a block diagram of an inter-site backup management system or apparatus 200, in accordance with some embodiments. The inter-site backup management system or apparatus 200 may be used as the inter-site backup management system or apparatus 170 of FIG. 1A.

Methods described herein of routing a target lot by an auxiliary route to a site, in accordance with one or more embodiments, are implementable, for example, using inter-site backup management system or apparatus 200, in accordance with some embodiments.

In some embodiments, inter-site backup management system or apparatus 200 is a general purpose computing device including a hardware processor 202 and a non-transitory, computer-readable storage medium 204. Storage medium 204, amongst other things, is encoded with, e.g., stores, computer program code 206, e.g., a set of executable instructions. Execution of instructions 206 by hardware processor 202 represents (at least in part) an inter-site backup management system or apparatus which implements a portion or all of the methods described herein in accordance with one or more embodiments (hereinafter, the noted processes and/or methods).

Processor 202 is electrically coupled to computer-readable storage medium 204 via a bus 208. The processor 202 is also electrically coupled to an I/O interface 210 by the bus 208. A network interface 212 is also electrically connected to the processor 202 via the bus 208. The network interface 212 is connected to a network 214, so that the processor 202 and the computer-readable storage medium 204 are capable of connecting to external elements via the network 214. The processor 202 is configured to execute computer program code 206 encoded in the computer-readable storage medium 204 in order to cause the system 200 to be usable for performing a portion or all of the noted processes and/or methods. In one or more embodiments, the processor 202 is a central processing unit (CPU), a multi-processor, a distributed processing system, an application specific integrated circuit (ASIC), a suitable processing unit, or combination thereof.

In one or more embodiments, the computer-readable storage medium 204 includes one or more of an electronic, magnetic, optical, electromagnetic, infrared or semiconductor system (or apparatus or device). For example, the computer-readable storage medium 204 may include a semiconductor or solid-state memory, a magnetic tape, a removable computer diskette, a random access memory (RAM), a read-only memory (ROM), a rigid magnetic disk, an optical disk, or combination thereof. In one or more embodiments using optical disks, the computer-readable storage medium 204 includes a compact disk-read only memory (CD-ROM), a compact disk-read/write (CD-R/W), and/or a digital video disc (DVD).

In one or more embodiments, the storage medium 204 stores the computer program code 206 configured to cause the system 200 to be usable for performing a portion or all of the noted processes and/or methods. In one or more embodiments, the storage medium 204 also stores information which facilitates performing a portion or all of the noted processes and/or methods. In one or more embodiments, the storage medium 204 stores a library 207 of standard functions. In one or more embodiments, the storage medium 204 stores a machine learning model 209 for generating a prediction or estimation which facilitates performing a portion or all of the noted processes, methods or both. For example, the machine learning model 209 may perform operation 314 and operation 316 of FIG. 3A, a process 330 of FIG. 3B, or both. The machine learning model 209 may be implemented as a control system 4224 (see FIG. 4A).

The inter-site backup management system or apparatus 200 includes I/O interface 210. The I/O interface 210 is coupled to external circuitry. In one or more embodiments, the I/O interface 210 includes a keyboard, keypad, mouse, trackball, trackpad, touchscreen, and/or cursor direction keys for communicating information and commands to the processor 202.

The inter-site backup management system or apparatus 200 also includes a network interface 212 coupled to the processor 202. The network interface 212 allows the system 200 to communicate with the network 214, to which one or more other computer systems are connected. The network interface 212 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 200. For example, the inter-site backup management system or apparatus 200 may communicate with the database 180 and the MES apparatuses 102, 112, 122 through the network 214 using the network interface 212.

The system 200 is configured to receive information through the I/O interface 210. The information received through the I/O interface 210 includes one or more of instructions, data, other parameters, or a combination thereof, for processing by the processor 202. The information is transferred to the processor 202 via the bus 208. The inter-site backup management system or apparatus 200 is configured to receive information related to a UI through the I/O interface 210. The information is stored in the computer-readable medium 204 as the user interface (UI) 242.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an inter-site backup management system or apparatus. In some embodiments, a portion or all of the noted processes and/or methods is implemented as a software application that is used by inter-site backup management system or apparatus 200.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 3A:
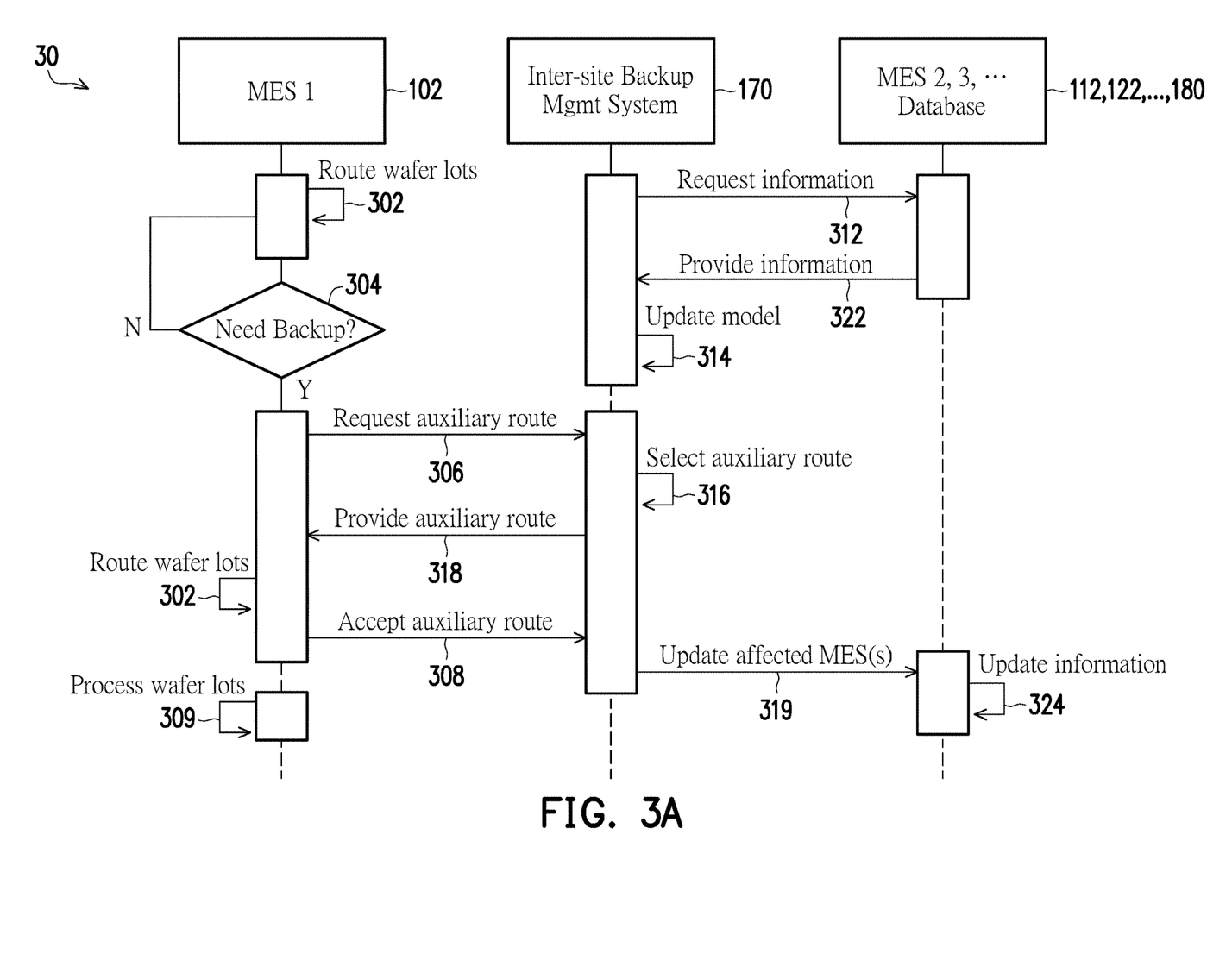
FIGS. 3A and 3B are flowcharts of methods of performing auxiliary routing according to various aspects of the present disclosure.

FIG. 3A is a flowchart of a method 30 of performing auxiliary routing according to various aspects of the present disclosure. The method 30 may be performed in full or in part by the MES apparatuses 102, 112, 122 of the sites 100, 110, 120, and the inter-site backup management system or apparatus 170.

In operations 312, 322, 314, the inter-site backup management system or apparatus 170 (or, simply, "the system 170") generates (including updating) a machine learning model, such as the machine learning model 209 (see FIG. 2). The system 170 requests information from the MES apparatuses 112, 122 and the database 180 in operation 312. Although not specifically illustrated in FIG. 3A, the system 170 also requests information from the MES apparatus 102. The information requested may include the site information, the transportation vehicle information, the traffic information, the weather forecast information, and the MES information described above with reference to FIG. 1A. The system 170 may request the information from the MES apparatuses 102, 112, 122 and the database 180, for example, through the network 214 using the network interface 212 (see FIG. 2).

In operation 322, the MES apparatuses 102, 112, 122 and the database 180 provide the requested information to the system 170. The MES apparatuses 102, 112, 122 and the database 180 may provide the requested information to the system 170 through the network 214 using network interfaces thereof. In some embodiments, the database 180 is stored in the storage medium 204 (see FIG. 2), and the system 170 (e.g., the processor 202) receives the information from the storage medium 204, for example, through the bus 208.

In operation 314, the system 170 updates the machine learning model 209 based on the information received in operation 322. Updating the machine learning model 209 is described in greater detail with reference to FIG. 4B, and may include training a neural network based on the information, which may include the information described with reference to FIG. 1A above, and may include training set data 4306, such as historical routing data 4308 and historical conditions data 4310 (see FIG. 4A).

Operations 312, 322, 314 may be performed on an ongoing routine basis, such as multiple times per day, multiple times per week, multiple times per month, or the like. In some embodiments, operations 312, 322, 314 are performed each time an auxiliary route request is made, for example, in operation 306. In some embodiments, some of the information is requested (e.g., updated) on an ongoing routine basis, and other of the information is requested each time an auxiliary route request is made. For example, the weather forecast information and traffic information may be requested periodically instead of each time an auxiliary route request is made. The site information, which may include loading information about the AMHS apparatuses 104, 114, 124, or about tool constraints (e.g., maintenance cycle/schedule, tool loading, or the like) may be requested each time an auxiliary route request is made. One reason for this is that each of the MES apparatuses 102, 112, 122 may be adding new lots (e.g., new routing, AMHS loading, and tool loading information) more frequently than would be captured by routine updates. For example, new lots may be added each hour, whereas the routine information requests may occur fewer than one time per day or a few times per week.

In operation 302, the MES apparatus 102 of site 100 generates a route for a wafer lot, such as the target lot 106 of FIG. 1A. Generating the route may be based on a processing plan, which may include process plan information. The process plan information may include information on semiconductor processing operations that are to be performed in a selected order to form integrated circuit dies on a semiconductor wafer. For example, the process plan information may indicate one or more tools (e.g., one or more of the semiconductor processing tools 108) that will perform semiconductor processing operations (e.g., deposition, etch, cleaning, anneal, or the like) on the target lot 106.

The process plan information may indicate target moves from a first tool (e.g., deposition) to a second tool (e.g., chemical mechanical planarization, or "CMP"), from the second tool to a third tool, and so on. The process plan information may indicate accumulated number of target moves at any intermediate stage of the processing plan. The process plan information may indicate a cycle time forecast or constraint. For example, the process plan information may describe a number of days or selected date by which the target lot 106 should complete undergoing the processing plan. The process plan information may indicate a priority level associated with the target lot 106. For example, the target lot 106 may have a priority level that is higher or lower than other lots, which may affect whether the target lot 106 is processed by one of the semiconductor processing tools before or after the other lot or lots.

The process plan information may indicate a quality time, similar to or the same as an expired-by time, which may be a selected time duration following a semiconductor processing operation before which it is beneficial to begin a subsequent semiconductor processing operation. For example, following deposition of a material, the selected time duration may be associated with an acceptable level of degradation (e.g., oxidation) of the material beyond which the deposition may need to be redone. For example, the target lot 106 may have a quality time that is shorter than other lots, such that the target lot 106 is processed by one of the semiconductor processing tools before the other lot or lots having longer quality time.

In operation 304, the MES apparatus 102 determines whether routing the target lot 106 to an auxiliary site (e.g., the site 110 or the site 120) would be beneficial. The determining may be according to loading status of one or more of the semiconductor processing tools 108 of the site 100. For example, the processing plan may have a target move of the target lot 106 from a first tool to a second tool of the semiconductor processing tools 108 within a quality time. If the second tool is at full capacity for the duration of the quality time, the MES apparatus 102 may determine that routing the target lot 106 to the site 110 or the site 120 as the auxiliary site would be beneficial. In another example, if the second tool is scheduled for maintenance for the duration of the quality time, the MES apparatus 102 may determine that routing the target lot 106 to the site 110 or the site 120 as the auxiliary site would be beneficial. Benefits of routing the target lot 106 to the site 110 or the site 120 as the auxiliary site may include one or more of reduced rework (e.g., due to the quality time being exceeded), increased utilization of semiconductor processing tools at the auxiliary site, higher WPH due to reduced time queueing for the second tool or reduced time in rework, among other benefits.

In some embodiments, the operations 302, 304 may be performed concurrently with the operations 312, 322, 314.

In operation 306, following determination that routing the target lot 106 to the auxiliary site would be beneficial, the MES apparatus 102 requests an auxiliary route from the inter-site backup management system or apparatus 170. The request sent to the system 170 from the MES apparatus 102 may include the target move or identification of the second tool of the target move. The request may include the quality time, priority level, and other information associated with the target lot 106 and the target move. In some embodiments, the request may include information associated with a sequence of target moves (e.g., 2 or more target moves). By including the sequence of target moves, the system 170 may generate an auxiliary route that keeps the target lot 106 in the auxiliary site for multiple semiconductor processing operations, instead of returning the target lot 106 to the site 100 after completing the semiconductor processing operation associated with the second tool.

Following receiving the request from the MES apparatus 102 in operation 306, the system 170 may select an auxiliary route in operation 316. Selecting the auxiliary route may be based on the machine learning model 209 generated and/or updated in operation 314. For example, the system 170 may select the auxiliary route by inputting the second tool, target move, sequence of target moves, quality time, priority level and optionally other information to the machine learning model 209. The machine learning model 209 may then select the auxiliary route, for example, based on the inputs received in the request, as well as based on the information stored in the database 180 (e.g., the weather forecast information, traffic information, and the like). In some embodiments, the machine learning model 209 outputs multiple auxiliary routes, each associated with a respective confidence level (e.g., 80%, 85%, or the like). In some embodiments, the selected auxiliary route is or includes an indicator (e.g., an identifier) of or associated with one of the semiconductor processing tools 118, 128 of the sites 110, 120, respectively.

In some embodiments, the selected auxiliary route includes a transportation method for transporting the target lot 106 to the selected semiconductor processing tool 118, 128. For example, the transportation method may include the AMHS apparatus(es) 104, 114, 124, or may include the transportation vehicle(s) 160. The transportation method may include scheduling information, such as a pickup time, drop-off time, or the like.

Following selection of the auxiliary route in operation 316, the system 170 provides the auxiliary route (or auxiliary routes) to the MES apparatus 102 in operation 318.

After the auxiliary route is received by the MES apparatus 102 in operation 318, the MES apparatus 102 may continue routing the wafer lots (e.g., the target lot 106) in operation 302, as shown, and may send an acknowledgement to the system 170 in operation 308. Operations 302 and 308 may be performed in any order or simultaneously. For example, the MES apparatus 102 may send an acknowledgement to accept the auxiliary route in operation 308 before adding the auxiliary route to the route in operation 302.

After the system 170 receives acknowledgement accepting the auxiliary route from the MES apparatus 102, the system 170 may update the MES apparatuses 112, 122 affected by the auxiliary route. For example, if the auxiliary route will send the target lot 106 to one of the semiconductor processing tools 118 of the site 110, the system 170 updates the MES apparatus 112 of the site 110, so that the MES apparatus 112 may take into account the new loading on the semiconductor processing tool 118 when routing wafer lots in the site 110. In operation 324, the MES apparatus 112 and/or the MES apparatus 122 updates the information associated with the semiconductor processing tool(s) affected by the auxiliary route. In some embodiments, the database 180 is optionally updated in operation 324 with information associated with the semiconductor processing tool(s) affected by the auxiliary route. The database 180 may be updated in operation 324 with information associated with loading on the routes 150, 152, 154, which may include sky bridges, OHT tracks of the AMHS apparatuses 104, 114, 124, and the like.

In operation 309, a semiconductor device is formed on a wafer of the wafer lot according to the route. The route associated with the wafer lot includes the auxiliary route (or a plurality of auxiliary routes). The wafer lot includes one or more semiconductor wafers. Integrated circuit (IC) dies are formed on the semiconductor wafers of the wafer lot. The formation of the IC dies includes forming semiconductor devices on and/or in the semiconductor wafers. The semiconductor devices are formed according to the route including the auxiliary route or routes.

Figure 3B:
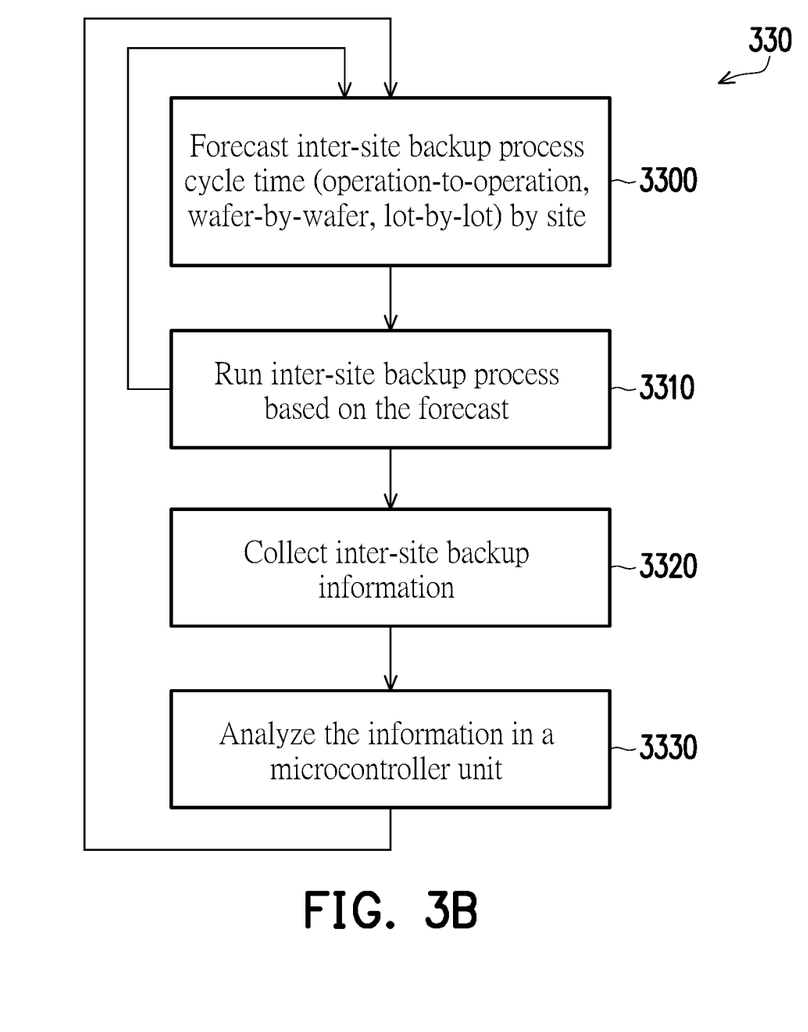

FIG. 3B is a flowchart of a method 330 in accordance with various embodiments.

In operation 3300, an inter-site backup process cycle time is forecasted by site (e.g., the sites 100, 110, 120). In some embodiments, the inter-site backup process cycle time is forecasted based on a statistical model (e.g., the machine learning model 209). The forecasting may be on an operation-to-operation, wafer-by-wafer, lot-by-lot, or other basis. In some embodiments, the inter-site backup process cycle time is a target for reduction, minimization or optimization based on the statistical model. For example, each of the sites 100, 110, 120 may have a respective cycle time that may be reduced by use of inter-site backup (e.g., assigning wafer lots to auxiliary routes).

In operation 3310, based on the forecast generated in operation 3300, an inter-site backup process may be run. The inter-site backup process may select auxiliary routes, for example, on a lot-by-lot basis, in a way that is beneficial to one or more performance metrics associated with the sites 100, 110, 120. In some embodiments, the performance metric is cycle time, which may be average cycle time across the sites 100, 110, 120. In some embodiments, the average cycle time is a weighted average cycle time, which may account for differences in the sites 100, 110, 120. Other performance metrics that may benefit from selection of the auxiliary routes can include one or more of average tool loading, WPH throughput, transport distance, number of auxiliary routes per wafer lot, or the like. In some embodiments, the inter-site backup process selects the auxiliary routes in a way that is beneficial to multiple of the performance metrics simultaneously. In some embodiments, the benefit to multiple performance metrics is weighted per performance metric, so as to take into account difference in priority of the various performance metrics.

In operation 3320, information or data is collected, which is associated with the inter-site backup process. The information or data collected may include training set data including historical routing data and historical conditions data (e.g., the training set data 4306 of FIG. 4A). The information or data may include information associated with the performance metrics described with reference to operation 3310.

In operation 3330, the information collected in operation 3320 may be analyzed by a microcontroller unit. The microcontroller unit may be a processor, microprocessor, controller, microcontroller, multi-processor, ASIC, RISC, or other appropriate circuit for analyzing the information. In some embodiments, the analysis includes determining an error value (e.g., the error value 4372 of FIG. 4B), which is associated with a difference between a predicted benefit to the performance metrics and an actual benefit to the performance metrics.

A result of operation 3330 and a result of operation 3310 may be fed back to operation 3300, such that the inter-site backup process cycle time (or other performance metrics) may be forecasted with greater accuracy over multiple iterations of the method 330.

Figure 4A:
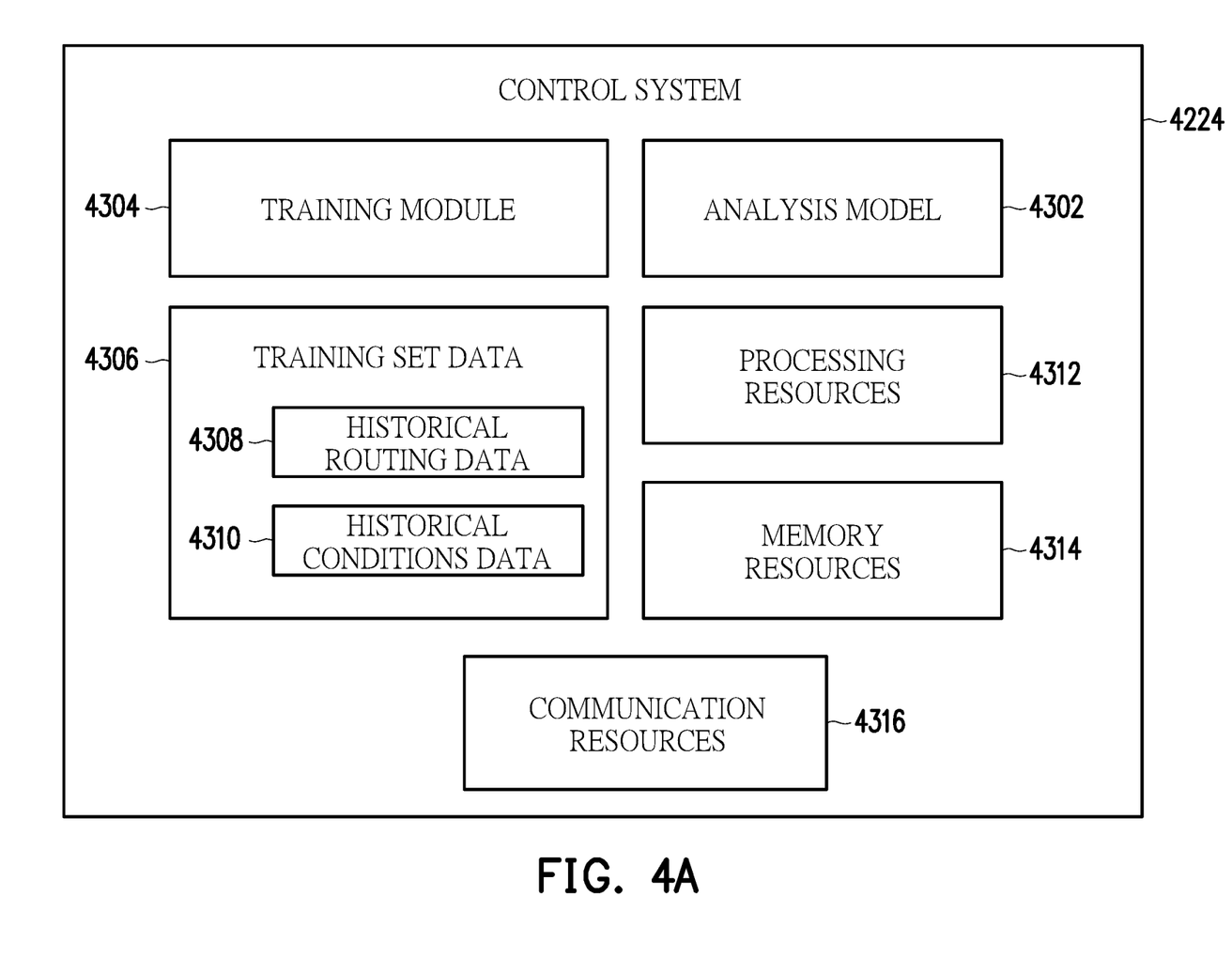
FIGS. 4A and 4B are views illustrating a method according to various aspects of the present disclosure.
Figure 4B:
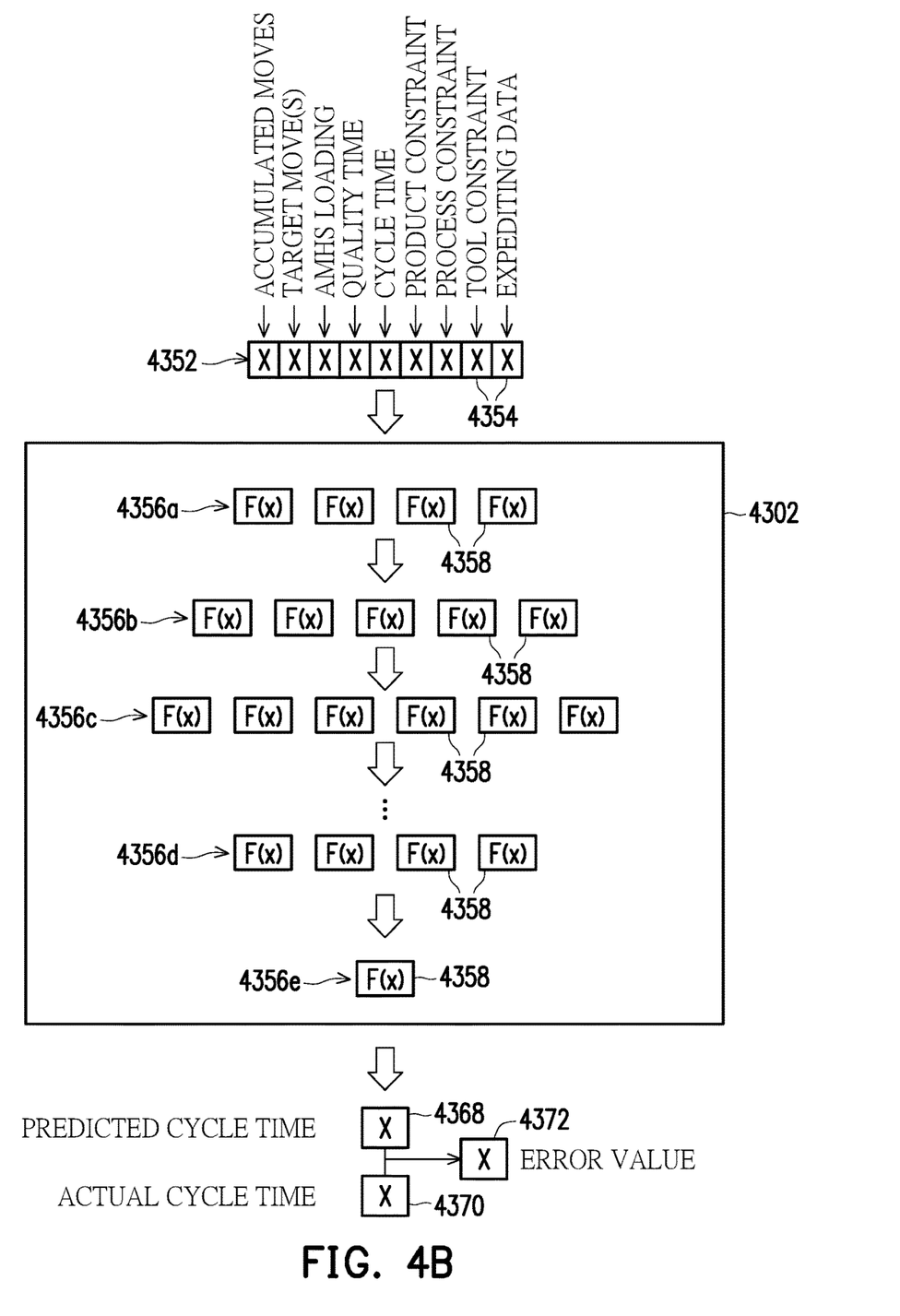

FIGS. 4A and 4B are views illustrating a method according to various aspects of the present disclosure. FIGS. 4A and 4B illustrate prediction of cycle time reduction (or other performance metrics) in accordance with various embodiments. FIG. 4A is a block diagram of a system 4224, which may be a control system for performing the operations 314, 316 of method 30, and/or the operations 3300, 3330 of the method 330, respectively. The control system 4224 may forecast cycle time (or other performance metrics) of the target lot 106 or the sites 100, 110, 120, and may select auxiliary routes based on the forecast parameters. In some embodiments, the control system 4224 utilizes machine learning to predict which auxiliary routes will improve the performance metrics described with reference to FIG. 3A and FIG. 3B.

In one embodiment, the control system 4224 includes an analysis model 4302 and a training module 4304. The training module 4304 trains the analysis model 4302 with a machine learning process. The machine learning process trains the analysis model 4302 to select the auxiliary routes, in some embodiments. Although the training module 4304 is shown as being separate from the analysis model 4302, in practice, the training module 4304 may be part of the analysis model 4302.

The control system 4224 includes, or stores, training set data 4306. The training set data 4306 includes historical routing data 4308 and historical conditions data 4310. The historical routing data 4308 includes data related to auxiliary routing of wafer lots. The historical conditions data 4310 includes data related to conditions under which auxiliary routing occurred, such as the site information, transportation vehicle information, traffic information, weather forecast information, MES information, and the like. As will be set forth in more detail below, the training module 4304 utilizes the historical routing data 4308 and the historical conditions data 4310 to train the analysis model 4302 with a machine learning process.

In one embodiment, the historical routing data 4308 includes data related to auxiliary routes selected for wafer lots. The historical routing data 4308 can include auxiliary routing data for a large number of wafer lots and target moves from one semiconductor processing tool to another semiconductor processing tool, and from one site to another site. For example, the historical routing data 4308 may include information about hundreds, thousands, or millions of auxiliary routes associated with wafer lots.

In one embodiment, the historical conditions data 4310 include various environmental conditions or parameters during auxiliary routing of wafers between the sites 100, 110, 120. Accordingly, for each auxiliary route having data in the historical routing data 4308, the historical conditions data 4310 can include the environmental conditions or parameters that were present during auxiliary routing of the wafer lots. For example, the historical conditions data 4310 can include data related to the sites 100, 110, 120, the transportation vehicles and/or AMHS apparatuses, traffic conditions, weather conditions, the MES apparatuses, and the like.

In some embodiments, the historical conditions data 4310 includes data associated with one or more of the wafer lots, accumulated moves, target move(s), AMHS loading, process quality time, cycle time forecast, product constraints, process constraints, process rework constraints, process tool/chamber constraints, process tool/chamber periodic maintenance cycles, process tool/chamber software constraints, or the like. In some embodiments, the historical conditions data 4310 includes data associated with customer expediting information, transportation vehicle loading information, road/boat/aircraft traffic jam information, power outage information, weather forecast information, MES mainframe loading information, MES virtual machine loading information, or the like.

In one embodiment, the training set data 4306 links the historical routing data 4308 with the historical conditions data 4310. In other words, the auxiliary route selections in the historical routing data 4308 are linked to the data in the historical conditions data 4310 (e.g., by labeling). As will be set forth in more detail below, the labeled training set data can be utilized in a machine learning process to train the analysis model 4302 to generate the various forecasts mentioned previously.

In one embodiment, the control system 4324 includes processing resources 4312, memory resources 4314, and communication resources 4316. The processing resources 4312 can include one or more controllers or processors. The processing resources 4312 are configured to execute software instructions, process data, make auxiliary route selections, perform signal processing, read data from memory, write data to memory, and to perform other processing operations. The processing resources 4312 can include physical processing resources 4312 and/or virtual processing resources 4312. The processing resources 4312 can include cloud-based processing resources including processors and servers accessed via one or more cloud computing platforms.

In one embodiment, the memory resources 4314 can include one or more computer readable memories. The memory resources 4314 are configured to store software instructions associated with the function of the control system 4224 and its components, including, but not limited to, the analysis model 4302. The memory resources 4314 can store data associated with the function of the control system 4224 and its components. The data can include the training set data 4306, current routing and/or conditions data, and any other data associated with the operation of the control system 4224 or any of its components. The memory resources 4314 can include physical memory resources and/or virtual memory resources. The memory resources 4314 can include cloud-based memory resources accessed via one or more cloud computing platforms. In some embodiments, the memory resources 4314 include the database 180.

In one embodiment, the communication resources 4316 can include wired and wireless communication resources, which can facilitate communication via one or more networks such as wired networks, wireless networks, the Internet, or an intranet. The communication resources 4316 can enable components of the control system 4224 to communicate with each other.

FIG. 4B is a block diagram illustrating operational aspects and training aspects of the analysis model 4302 of FIG. 4A, according to one embodiment. As described previously, the training set data 4306 includes data related to a plurality of previously routed semiconductor wafer lots. Each previously routed semiconductor wafer lot was routed with particular environmental conditions and resulted in a particular processing result (e.g., cycle time). One or more of accumulated moves, target move(s), AMHS loading, process quality time, cycle time forecast, product constraints, process constraints, process rework constraints, process tool/chamber constraints, process tool/chamber periodic maintenance cycles, process tool/chamber software constraints, customer expediting information, transportation vehicle loading information, road/boat/aircraft traffic jam information, power outage information, weather forecast information, MES mainframe loading information, MES virtual machine loading information, for example, are formatted into a respective conditions matrix 4352. The conditions matrix 4352 includes a plurality of data vectors 4354. Each data vector 4354 corresponds to a particular parameter.

The example of FIG. 4B illustrates a single conditions matrix 4352 that will be passed to the analysis model 4302 during the training process. In the example of FIG. 4B, the conditions matrix 4352 includes nine data vectors 4354, each corresponding to a parameter of the route. For condition types that are not naturally represented in numbers, such as raw material names, a number can be assigned to each possible material.

The analysis model 4302 includes a plurality of neural layers 4356a-e. Each neural layer includes a plurality of nodes 4358. Each node 4358 can also be called a neuron. Each node 4358 from the first neural layer 4356a receives the data values for each data field from the conditions matrix 4352. Accordingly, in the example of FIG. 4B, each node 4358 from the first neural layer 4356a receives 36 data values because the conditions matrix 4352 has 36 data scalars (9*4=36). Each neuron 4358 includes a respective internal mathematical function labeled F(x) in FIG. 4B. Each node 4358 of the first neural layer 4356a generates a scalar value by applying the internal mathematical function F(x) to the data values from the data fields 4354 of the conditions matrix 4352. Further details regarding the internal mathematical functions F(x) are provided below.

Each node 4358 of the second neural layer 4356b receives the scalar values generated by each node 4358 of the first neural layer 4356a. Accordingly, in the example of FIG. 4B each node of the second neural layer 4356b receives four scalar values because there are four nodes 4358 in the first neural layer 4356a. Each node 4358 of the second neural layer 4356b generates a scalar value by applying the respective internal mathematical function F(x) to the scalar values from the first neural layer 4356a.

Each node 4358 of the third neural layer 4356c receives the scalar values generated by each node 4358 of the second neural layer 4356b. Accordingly, in the example of FIG. 4B, each node of the third neural layer 4356c receives five scalar values because there are five nodes 4358 in the second neural layer 4356b. Each node 4358 of the third neural layer 4356c generates a scalar value by applying the respective internal mathematical function F(x) to the scalar values from the nodes 4358 of the second neural layer 4356b.

Each node 4358 of the neural layer 4356d receives the scalar values generated by each node 4358 of the previous neural layer (not shown). Each node 4358 of the neural layer 4356d generates a scalar value by applying the respective internal mathematical function F(x) to the scalar values from the nodes 4358 of the second neural layer 4356b.

The final neural layer includes only a single node 4358. The final neural layer receives the scalar values generated by each node 4358 of the previous neural layer 4356d. The node 4358 of the final neural layer 4356e generates a data value 4368 by applying a mathematical function F(x) to the scalar values received from the nodes 4358 of the neural layer 4356d.

In the example of FIG. 4B, the data value 4368 corresponds to the predicted cycle time corresponding to values included in the conditions matrix 4352. The predicted cycle time may be represented as a confidence level (e.g., a percentage) in the data value 4368. In some embodiments, the final neural layer 4356e may generate data values corresponding to the various forecasts described above. The final neural layer 4356e will include a respective node 4358 for each output data value to be generated. For example, a respective node 4358 may be included for predicted cycle time of the respective sites 100, 110, 120.

During the machine learning process, the analysis model compares the predicted cycle time in the data value 4368 to the actual cycle time, as indicated by the data value 4370. In some embodiments, the training set data 4306 includes, for each set of historical conditions data, historic cycle time results data indicating the cycle time of the wafer lot that resulted from the auxiliary routing process. Accordingly, the data field 4370 includes the actual cycle time of the fabricating process reflected in the conditions matrix 4352. The analysis model 4302 compares the predicted cycle time from the data value 4368 to the actual cycle time from the data value 4370. The analysis model 4302 generates an error value 4372 indicating the error or difference between the predicted cycle time from the data value 4368 and the actual cycle time from the data value 4370. The error value 4372 is utilized to train the analysis model 4302. In some embodiments, the error value 4372 is a difference in confidence levels (e.g., percentages).

The training of the analysis model 4302 can be more fully understood by discussing the internal mathematical functions F(x). While all of the nodes 4358 are labeled with an internal mathematical function F(x), the mathematical function F(x) of each node is unique. In one example, each internal mathematical function has the following form:

?? No description in [0090]

$$F(x) = x1*w1 + x2*w2 + xn*w1 + b.$$

?? No description in [0092]

In the equation above, each value x1-xn corresponds to a data value received from a node 4358 in the previous neural layer, or, in the case of the first neural layer 4356a, each value x1-xn corresponds to a respective data value from the data fields 4354 of the reflector conditions matrix 4352. Accordingly, n for a given node is equal to the number of nodes in the previous neural layer. The values w1-wn are scalar weighting values associated with a corresponding node from the previous layer. The analysis model 4302 selects the values of the weighting values w1-wn. The constant b is a scalar biasing value and may also be multiplied by a weighting value. The value generated by a node 4358 is based on the weighting values w1-wn. Accordingly, each node 4358 has n weighting values w1-wn. Though not shown above, each function F(x) may also include an activation function. The sum set forth in the equation above is multiplied by the activation function. Examples of activation functions can include rectified linear unit (ReLU) functions, sigmoid functions, hyperbolic tension functions, or other types of activation functions.

After the error value 4372 has been calculated, the analysis model 4302 adjusts the weighting values w1-wn for the various nodes 4358 of the various neural layers 4356a-4356e. After the analysis model 4302 adjusts the weighting values w1-wn, the analysis model 4302 again provides the reflector conditions matrix 4352 to the input neural layer 4356a. Because the weighting values are different for the various nodes 4358 of the analysis model 4302, the predicted reflectivity 4368 will be different than in the previous iteration. The analysis model 4302 again generates an error value 4372 by comparing the actual fabrication tool 4370 to the predicted fabrication tool 4368.

The analysis model 4302 again adjusts the weighting values w1-wn associated with the various nodes 4358. The analysis model 4302 again processes the conditions matrix 4352 and generates a predicted expiration 4368 and associated error value 4372. The training process includes adjusting the weighting values w1-wn in iterations until the error value 4372 is minimized.

FIG. 4B illustrates a single conditions matrix 4352 being passed to the analysis model 4302. In practice, the training process includes passing a large number of conditions matrices 4352 through the analysis model 4302, generating a predicted fabrication tool 4368 for each conditions matrix 4352, and generating associated error value 4372 for each predicted fabrication tool. The training process can also include generating an aggregated error value indicating the average error for all routes for a batch of conditions matrices 4352. The analysis model 4302 adjusts the weighting values w1-wn after processing each batch of conditions matrices 4352. The training process continues until the average error across all conditions matrices 4352 is less than a selected threshold tolerance. When the average error is less than the selected threshold tolerance, the analysis model 4302 training is complete and the analysis model is trained to accurately predict the cycle time that is associated with the auxiliary route based on the historical routing and conditions data. The analysis model 4302 can then be used to predict cycle time and to select auxiliary routes that will result in reduction of cycle time. During use of the trained model 4302, a current conditions vector or matrix, representing current routing and conditions (e.g., site conditions, weather conditions, traffic conditions, etc.), and having similar format as the conditions matrix 4352, is provided to the trained analysis model 4302. The trained analysis model 4302 can then predict a cycle time that will result from those conditions.

A particular example of a neural network based analysis model 4302 has been described in relation to FIG. 4B. However, other types of neural network based analysis models, or analysis models of types other than neural networks can be utilized without departing from the scope of the present disclosure. Furthermore, the neural network can have different numbers of neural layers having different numbers of nodes without departing from the scope of the present disclosure. The neural network can predict auxiliary routes instead of cycle time, as described with reference to FIG. 3A. For example, the output of the neural network may be a selected auxiliary route that is provided to one of the MES apparatuses 102, 112, 122 in operation 318 of the method 30.

Embodiments may provide advantages. The inter-site backup system 170 and methods 30, 330 of the embodiments provide auxiliary routing between different sites with consideration to manufacturing constraints, weather influence, traffic constraints, and even power, water, or chemical supply constraints, among others. As such, tool utilization may be increased, wafer lot throughput may be increased, and cycle time may be decreased.

In accordance with at least one embodiment, a method includes: receiving an auxiliary routing request from a manufacturing execution system (MES) apparatus of a first site by an inter-site backup management apparatus; selecting an auxiliary route to a second site based on the auxiliary routing request and a statistical model by the inter-site backup management apparatus; including the auxiliary route in a route associated with a wafer lot by the MES apparatus; and performing a semiconductor processing operation on a wafer of the wafer lot according to the route.

In accordance with at least one embodiment, a method includes: generating a statistical model associated with an inter-site backup process; assigning an auxiliary route to a first wafer lot of a first site by an inter-site backup management apparatus according to the statistical model and conditions of the first site and a second site; generating historical routing data by processing the first wafer lot according to the auxiliary route; and updating the statistical model based on the historical routing data by the inter-site backup management apparatus.

In accordance with at least one embodiment, a method includes: performing a first semiconductor processing operation on a wafer lot, the first semiconductor processing operation being performed at a first site; transferring the wafer lot to a second site based on an auxiliary route generated by an inter-site backup management apparatus based on a statistical model, the transferring including: transferring the wafer lot to a location between the first site and the second site by a first automated materials handling system (AMHS) apparatus of the first site; and transferring the wafer lot from the location by a second AMHS apparatus of the second site; and performing a second semiconductor processing operation on the wafer lot, the second semiconductor processing operation being performed at the second site.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   receiving an auxiliary routing request from a manufacturing execution system (MES) apparatus of a first site by an inter-site backup management apparatus;
   selecting an auxiliary route to a second site based on the auxiliary routing request and a statistical model by the inter-site backup management apparatus;
   including the auxiliary route in a route associated with a wafer lot by the MES apparatus; and
   performing a semiconductor processing operation on a wafer of the wafer lot according to the route,
   wherein the auxiliary route includes transferring the wafer lot through a stocker that is accessible by both a first automatic material handling system (AMHS) apparatus of the first site and a second AMHS apparatus of the second site, the stocker including a conveyor apparatus having a defined loading capacity, and wherein selecting the auxiliary route comprises accounting for said loading capacity when determining whether the stocker is available to receive the wafer lot.

2. The method of claim 1, wherein the auxiliary route is selected based on a loading index associated with the second site.

3. The method of claim 2, wherein the loading index includes a number of wafer lots in process, an accumulated number of moves, a target move, an automatic material handling system (AMHS) loading, or a combination thereof.

4. The method of claim 1, wherein the auxiliary route is selected based on a priority level, a quality time, a cycle time, or combination thereof.

5. The method of claim 1, wherein the auxiliary route is selected based on a product constraint, a process constraint, a rework constraint, a tool constraint, a tool maintenance cycle, or combination thereof.

6. The method of claim 1, wherein the auxiliary route is selected based on transportation vehicle loading, traffic jam data, weather forecast data, power outage data, or a combination thereof.

7. The method of claim 1, further comprising:
generating the statistical model by training a neural network.

8. A method, comprising:
generating or updating a statistical model for selecting an auxiliary route from a first site to a second site in a semiconductor manufacturing environment, including receiving training set data describing historical routing conditions;
receiving, by an inter-site backup management apparatus, an auxiliary routing request from a manufacturing execution system (MES) apparatus of the first site for a wafer lot;
selecting, by the inter-site backup management apparatus, the auxiliary route based on the statistical model;
including the auxiliary route in a route associated with the wafer lot by the MES apparatus; and
performing a semiconductor processing operation on the wafer lot according to the route, including transferring the wafer lot from the first site to the second site, wherein transferring the wafer lot from the first site to the second site comprises verifying that a stocker interconnecting the first site and the second site is below a threshold loading capacity.

9. The method of claim 8, further comprising generating the training set data from historical conditions data including at least one of:
traffic conditions,
weather forecasts, or
an accumulated number of moves for the wafer lot.

10. The method of claim 9, wherein the statistical model comprises a neural network trained to reduce a difference between a predicted cycle time for the wafer lot and an actual cycle time for the wafer lot.

11. The method of claim 8, wherein selecting the auxiliary route is further based on a capacity constraint of a stocker accessible by both an automatic material handling system (AMHS) apparatus of the first site and an AMHS apparatus of the second site.

12. The method of claim 8, further comprising forecasting an inter-site backup process cycle time based on the statistical model, wherein selecting the auxiliary route is based at least in part on reducing the forecasted inter-site backup process cycle time.

13. The method of claim 8, wherein the auxiliary routing request includes a priority level and a quality time constraint for the wafer lot, and wherein selecting the auxiliary route comprises satisfying the quality time constraint for the wafer lot based on the priority level.

14. The method of claim 8, further comprising transferring the wafer lot from the first site to the second site via a sky bridge interconnected with overhead hoist transport tracks of the first site and the second site.

15. A method, comprising:
performing a first semiconductor processing operation on a wafer lot at a first site;
determining, by a manufacturing execution system (MES) apparatus, that the wafer lot should be routed to a second site for a subsequent semiconductor processing operation;
sending, by the MES apparatus to an inter-site backup management apparatus, an auxiliary routing request;
selecting, by the inter-site backup management apparatus, an auxiliary route to the second site based on a statistical model trained with historical routing data;
transferring the wafer lot to the second site according to the auxiliary route; and
performing the subsequent semiconductor processing operation on the wafer lot at the second site, wherein transferring the wafer lot to the second site comprises verifying that a stocker interconnecting the first site and the second site is below a threshold loading capacity.

16. The method of claim 15, wherein the auxiliary routing request includes an indication that a scheduled tool maintenance at the first site would cause a delay exceeding a quality time threshold for the wafer lot.

17. The method of claim 15, wherein the threshold loading capacity is determined as a number of wafer lots transferred through the stocker during a selected time interval.

18. The method of claim 15, wherein the auxiliary routing request includes an indication that a process constraint at the first site would cause a delay exceeding a quality time threshold for the wafer lot.

19. The method of claim 18, wherein the process constraint comprises at least one of:
a scheduled tool maintenance at the first site,
a rework constraint, or
an AMHS loading constraint.

20. The method of claim 15, wherein selecting the auxiliary route is further based on at least one of traffic jam data, weather forecast data, or power outage data stored in a database accessible by the inter-site backup management apparatus.

* * * * *